United States Patent [19]

Wedlake

[11] Patent Number: 5,139,897
[45] Date of Patent: Aug. 18, 1992

[54] ELECTROCHEMICAL CELL

[75] Inventor: Roger J. Wedlake, Mulbarton, South Africa

[73] Assignee: Lilliwyte Societe Anonyme, Luxembourg

[21] Appl. No.: 645,222

[22] Filed: Jan. 24, 1991

[30] Foreign Application Priority Data

Feb. 20, 1990 [GB] United Kingdom ............... 9003760

[51] Int. Cl.$^5$ ........................................... H01M 10/39
[52] U.S. Cl. ........................................ 429/86; 429/103
[58] Field of Search ...................... 501/57, 82, 86, 102, 501/103

[56] References Cited

U.S. PATENT DOCUMENTS

| 4,774,156 | 9/1988 | Bones et al. | 429/103 |
| 4,895,773 | 1/1990 | Bones et al. | 429/7 |
| 4,975,344 | 12/1990 | Wedlake et al. | 429/103 |

FOREIGN PATENT DOCUMENTS

| 3827479 | 2/1989 | Fed. Rep. of Germany . |
| 4016345 | 11/1990 | Fed. Rep. of Germany . |
| 2221862 | 2/1990 | United Kingdom . |
| 2210727 | 3/1991 | United Kingdom . |

OTHER PUBLICATIONS

McGraw-Hill Encyclopedia of Science and Technology, vol. 13, pp. 182-188.

Primary Examiner—Karl Group
Attorney, Agent, or Firm—Arnold, White & Durkee

[57] ABSTRACT

The invention provides a high temperature electrochemical cell having an anode and a cathode separated by a separator. The cell has a housing divided by the separator into two cell compartments for the anode and cathode, each of which compartments contains liquid at the cell operating temperature, and has a gas space therein above the liquid, containing an inert gas. The cell compartments are in communication with each other, e.g. by passage, and are otherwise sealed. This communication is above the levels of the liquid in the compartments at all stages of charge of the cell.

12 Claims, 3 Drawing Sheets

ELECTROCHEMICAL CELL

This invention relates to an electrochemical cell. More particularly, the invention relates to a high temperature rechargeable electrochemical power storage cell of the type having a cell housing divided by a separator into an anode compartment containing an anode and a cathode compartment containing a cathode.

According to the invention there is provided a high temperature electrochemical power storage cell which comprises an anode and a cathode separated by a separator which is a conductor of electrochemically active anode material, the anode and the cathode being located in a cell housing which is divided by the separator into an anode compartment containing the anode and a cathode compartment containing the cathode, the anode being a molten liquid at the operating temperature of the cell and the cathode compartment containing a liquid at the operating temperature of the cell, each of the anode compartment and the cathode compartment having therein, above the liquid therein, a gas space occupied by an inert gas and a vapour arising from the liquid in said compartment, the inert gas having a partial pressure in each said gas space at the operating temperature of the cell of at least 10 kPa (about 0,1 atmospheres), the compartments being in communication with each other but being otherwise sealed, and the cell having an operative attitude in which attitude it is upright and in which the communication between the compartments is at a level above the levels of the liquids in the compartments at all states of charge of the cell.

The liquid in the cathode compartment will be an electrolyte or catholyte which is molten at the cell operating temperature; and each gas space will contain, in addition to the inert gas, one or more vapours arising from the liquid in that compartment. The communication between the compartments will be in the form of an opening or passage extending from one compartment to the other, entering said compartments above the respective liquid levels therein.

In such cells the liquid level in the anode compartment rises during charging and drops during discharging, the liquid level in the cathode compartment rising during discharging and dropping during charging, the volume change of the cell compartment contents below their gas spaces not however necessarily being equal. Thus, in operation, gas will flow via the opening or passage from the cathode compartment into the anode compartment during discharging and from the anode compartment into the cathode compartment during charging. The pressure in the anode compartment gas space will at all times be the same as the pressure in the cathode compartment gas space, so that for all practical purposes there will be no pressure drop in either direction across the separator. However, as indicated above, as the volume change of the non-gaseous contents of the one compartment is not necessarily the same as the volume change of the non-gaseous contents of the other compartment during a charge/discharge cycle, the absolute pressure in the gas spaces may vary from time to time, depending on the state of charge of the cell.

In use, the gas space of the anode compartment will be occupied by inert gas and by such vapour or vapours as are given off by the liquid in the anode compartment and by the liquid in the cathode compartment. Depending on the nature of the vapour or vapours in question, movement of vapours given off by the liquid in the anode compartment from the anode compartment to the cathode compartment, or vice versa, can be detrimental to the cell.

Accordingly, in one embodiment, the communication between the compartments may be by means of a passage interconnecting the compartments, the cell including, in said passage, at least one vapour trap for extracting at least one vapour arising from said liquids from inert gas flowing along the passage. Thus, may include two said vapour traps in the passage, namely an anode vapour trap for extracting vapour arising from the liquid in the anode compartment from the inert gas, and a cathode vapour trap for extracting vapour arising from the liquid in the cathode compartment from the inert gas. More particularly, the anode vapour trap may contain molten anode material, being located between the anode and the cathode vapour trap, the cathode vapour trap containing the same liquid as that occupying the cathode compartment and being located between the cathode and the anode vapour trap.

In another embodiment, the separator may be in the form of a holder for the anode material, holding the active anode material in its interior, the holder being located in the interior of the cathode compartment and the cathode compartment providing the cell housing. Thus, the holder may be in the form of a laterally compressed, e.g. flattened, envelope, having a pair of spaced major faces joined to each other at their edges, the envelope being in communication with a reservoir for anode material, the reservoir forming part of the holder and being located above the envelope in the operative attitude of the cell, and the cathode comprising two portions located on opposite sides of the envelope.

In general, in cells of the type in question, it is desirable to keep the gas spaces as small as possible, to promote high volumetric energy density in the cell. Furthermore, it is desirable to keep the average pressure in the gas spaces during charge/discharge cycling as close as possible to atmospheric pressure, to reduce gas leakage into or out of the cell housing, particularly during long-term operation over a multiplicity of charge/discharge cycles, e.g. several months or years. A yet further consideration in cell design is to keep the inert gas pressure in the gas spaces relatively high when compared with the vapour pressures, at the cell operating temperature, of any vapour or vapours in the gas spaces arising from liquids in the compartments, so as to keep the partial pressures and proportions of such vapours in the gas spaces at acceptably low values, particularly when movement thereof via the opening or passage from the compartment in which they arise to the other compartment, as discussed above, is detrimental.

Bearing these considerations in mind, it is desirable to employ a gas space in each compartment, by suitable choice of compartment size and bearing in mind cell capacity, such that the gas space in the anode compartment is as fully occupied by anode compartment liquid as is practicable when the cell is fully charged, and such that the gas space in the cathode compartment is similarly as fully occupied by cathode compartment liquid as is practicable when the cell is fully discharged.

At the same time, the inert gas pressure is preferably selected so that, at a state of charge intermediate the fully charged and discharged states of the cell, e.g. when the cell is midway charged/discharged, the pressure in the gas spaces is equivalent to atmospheric pressure at the cell operating temperature, and so that the pressure difference between the interior of the housing and the exterior of the housing is kept to an acceptably low value in the fully charged and discharged states of the cell.

More particularly, inert gas partial pressure in the gas spaces may be selected so that, at the operating temperature of the cell, at a state of charge of the cell intermediate the extreme fully charged state and the extreme fully discharged state of the cell, the total pressure in the compartments is equal to atmospheric pressure, and so that the change in said total pressure between said intermediate state of charge and said extreme states of charge is the same in magnitude.

By employing inert gas pressures of substantial magnitude, e.g. of the order of 1 atmosphere, in the gas spaces, the proportion of vapour from the liquids in the compartments in the gas spaces can be kept relatively low, thereby reducing the load on any vapour trap employed in any passage. Naturally, the volume of any passage must be borne in mind, together with the size of the gas spaces, to ensure that excessively high pressure differences between the interior and the exterior of the cell housing are avoided during cell operation at various states of charge of the cell. Routine experimentation and trading off of the above requirements will thus be employed to obtain suitable volumes for the gas spaces and any passage, and suitable pressures in the gas spaces during cell operation.

The Applicant believes that the present invention will have particular application to cells of the type having a molten alkali metal anode, a separator which is a solid electrolyte conductor of ions of the alkali metal of the anode, and a liquid electrolyte or catholyte in the cathode compartment which is in the form of a molten salt, such as a metal halide. In particular, the anode material may be sodium, the separator being a ceramic such as beta-alumina, beta"-alumina or nasicon, and the cathode compartment may contain, in addition to a suitable active cathode substance, a sodium aluminium halide molten salt electrolyte. In this case the active cathode substance may comprise, in its charged state, a member of the group consisting of $FeCl_2$, $NiCl_2$, $CrCl_2$, $CoCl_2$, $MnCl_2$ and $CuCl_2$, dispersed in fine particle and/or thin layer form an electronically conductive electrolyte-permeable matrix impregnated with liquid electrolyte, which electrolyte may be sodium aluminium chloride [$NaAlCl_4$]. The electrolyte should preferably be selected so that, at all states of charge, the Al:Na atomic ratio is not greater than 1:1. This can be effected by ensuring that the cathode compartment contains, in the fully charged state of the cell, some excess solid NaCl, e.g. dispersed in the cathode matrix. This ensures that the electrolyte is always saturated with regard to NaCl, and ensures that the Al:Na atomic ratio in the molten salt electrolyte will always be slightly less than 1:1.

Accordingly, in a particular embodiment of the cell, the anode may be a molten alkali metal, the separator being a solid electrolyte conductor of ions of the alkali metal of the anode, and the liquid in the cathode compartment being selected from the group consisting of molten salt electrolytes and molten salt catholytes. More particularly, the molten alkali metal anode may be sodium, the solid electrolyte being a conductor of sodium ions, and the liquid in the cathode compartment being a metal halide electrolyte, the cathode comprising a solid active cathode substance in contact with the liquid electrolyte. In a still more specific embodiment, the solid electrolyte may be $\beta''$-alumina, the liquid electrolyte being a sodium aluminium halide molten salt electrolyte in which, at all stages of charge of the cell, the Al:Na atomic ratio is no greater than 1:1, and the active cathode substance being a member of the group consisting of $FeCl_2$, $NiCl_2$, $CrCl_2$, $CoCl_2$, $MnCl_2$, $CuCl_2$ and mixtures of two of more thereof, the active cathode substance being dispersed in an electronically conductive electrolyte-permeable matrix impregnated with said molten salt electrolyte, the inert gas in the gas spaces being argon.

Employing this electrolyte has a two-fold advantage: first that the active cathode substance is substantially insoluble therein and remains dispersed in solid form in the matrix, remote from the separator which can be poisoned by the active cathode substance in solution, and, secondly, that the vapour pressure of the electrolyte is at or near its minimum. Minimum solubility of active cathode substance [$FeCl_2$, $NiCl_2$, $CrCl_2$, $CoCl_2$, $MnCl_2$ or $CuCl_2$] and minimum vapour pressure in fact occur at an Al:Na mole ratio of 1:1, but, when the Al:Na mole ratio is slightly less than 1:1, said solubility and vapour pressure remain acceptably low.

In this type of cell, the anode space will contain inert gas, conveniently argon as indicated above, and a small proportion of sodium vapour, while the cathode space will contain inert gas and a small proportion of $AlCl_3$ vapour and/or $NaAlCl_4$ vapour, together possibly with some HCl vapour which may be present as an impurity arising from water contamination of the electrolyte.

For this type of cell, the passage may have a vapour trap having a construction similar to a conventional steam trap, and may contain e.g. liquid Na as a scavenger for said vapours. Instead or in addition, the passage may have a vapour trap containing molten $NaAlCl_4$ in contact with a proportion of solid NaCl and aluminium metal. Preferably, as indicated above, the passage has two vapour traps, e.g. said liquid sodium vapour trap adjacent the anode compartment, and said molten $NaAlCl_4$ vapour trap with NaCl and aluminium, between the liquid sodium vapour trap and the cathode compartment.

As indicated above, in a different version of the invention there need be no passage with vapour trap, but merely an opening or hole in the separator between the anode compartment and the cathode. In this case the anode compartment may be an anode holder of material, such as a solid electrolyte, which is a conductor of ions of the anode material such as the ceramics mentioned above, or an ion-conducting glass or glass-/ceramic mixture or composite. The anode compartment will thus be the interior of the holder, the holder being in the interior of the housing and the cathode compartment being the interior of the housing outside the holder.

More particularly, the holder or envelope may be in the form of a laterally flattened envelope, comprising a pair of spaced major faces joined at their edges, the envelope being in communication with a reservoir for anode material forming part of the holder and located above the envelope in the operative attitude of the cell. In this case the cathode, when it comprises a matrix as described above, may have the matrix in the form of two flattened portions located on opposite sides of the envelope and face-to-face therewith, the matrix portions being located below the reservoir and immersed in electrolyte which occupies the cathode compartment to a level below that of the reservoir in said operative attitude.

More particularly, the opening may be provided at the top of the reservoir, above the level of anode material in the reservoir in the fully charged state of the cell.

During normal operation it is expected that the space in the reservoir above the anode material will contain inert gas and, in addition, vapour from the molten anode material which, as indicated above, will typically be an alkali metal such as sodium. Similarly, during normal operation it is expected that the space in the housing above the liquid electrolyte and outside the envelope will contain inert gas and, in addition, vapour from the liquid electrolyte, e.g., as in the example mentioned above, sodium vapour and argon in the anode compartment, and argon and $AlCl_3$ and/or $NaAlCl_4$ in the cathode compartment. Typically, in normal operation in which the electrolyte is NaCl-rich the gases in the cathode compartment will be substantially limited to argon and $NaAlCl_4$, but upon overcharge, when the electrolyte becomes $AlCl_3$-rich, progressively more $AlCl_3$ can be present in the cathode compartment atmosphere.

The amount of vapour in each compartment depends on the vapour pressure of the species in question and the cell temperature. At the temperatures in question the vapour pressure of $NaAlCl_4$ is expected to be about half that of $AlCl_3$ and the vapour pressure of $AlCl_3$ in turn is about an order of magnitude lower than that of sodium. The sodium vapour pressure in turn will typically be considerably lower than the partial pressure of the inert gas in the cell.

Both $AlCl_3$ and $NaAlCl_4$ react with sodium in liquid or vapour form according to the following respective reactions:

$$3Na + AlCl_3 \rightarrow 3NaCl + Al$$

$$3Na + NaAlCl_4 \rightarrow 4NaCl + Al$$

Accordingly, in normal operation, because of its greater vapour pressure, sodium vapour will tend to enter the cathode compartment from the anode compartment and will react there with the $NaAlCl_4$ vapour present, more rapidly than $NaAlCl_4$ will tend to leave the cathode compartment and enter the anode compartment. To a lesser but similar extent, during overcharging, $AlCl_3$ will also tend to enter the anode compartment from the cathode compartment, to react in the anode compartment with the sodium vapour. The reaction products of the above reactions, namely NaCl and Al, are thus expected to be produced predominantly in the cathode compartment and only to a lesser extent in the anode compartment. Such said reaction products as are produced in the anode compartment gas space can thus drift downwardly in the anode compartment to form a skin or layer on the upper surface of the liquid sodium anode material. This skin or layer can in principle move up and down in the anode compartment as the sodium level changes during charging and discharging, and the skin or layer can at least partially suppress further evaporation of sodium by substantially reducing the area of liquid sodium in the anode compartment which is exposed to the atmosphere above it.

The major proportion of any said reaction products, which are expected to be produced in the cathode compartment gas space, will drift downwardly into the $NaAlCl_4$ electrolyte in the cathode compartment where, when a charging potential is applied to the cell, they can react according to the electrochemical reaction:

$$4NaCl + Al \rightarrow NaAlCl_4 + 3Na$$

thus being rendered harmless, as the $NaAlCl_4$ produced forms part of the electrolyte and the sodium produced migrates through the separator during charging into the anode compartment.

Indeed, depending on the actual values of said vapour pressures at the cell operating temperature, the situation could possibly arise where, in the absence of charging or discharging, very little $NaAlCl_4$ vapour at all finds its way into in the anode compartment, sodium vapour and argon substantially filling the anode compartment and cathode compartment, and most of the $NaAlCl_4$ vapour leaving the upper surface of the electrolyte in the cathode compartment immediately reacting, at or adjacent said surface, with sodium vapour which has entered the cathode compartment from the anode compartment. Similar considerations apply to any $AlCl_3$ vapour produced on overcharging, the major amount of which remains in the cathode compartment and reacts there with sodium vapour. Naturally, during charging, bulk movement of gas will take place between the anode and cathode compartments, so that the amount of vapour reaction between sodium and $NaAlCl_4$ and/or $AlCl_3$ in the anode compartment need not always be negligible compared with that taking place in the cathode compartment.

If desired, further barriers may be provided, typically in the anode compartment, to reduce the above reactions, while still permitting gas flow between the anode compartment and the cathode compartment. In this way the nett migration of $AlCl_3$ and $NaAlCl_4$ from the cathode compartment into the anode compartment, to react there with the sodium, can be kept to a minimum.

Thus, the cell may include a layer of particles which are chemically inert in the cell environment and float on at least one of the liquids in the compartments, the layer acting to reduce the surface area of the liquid in that compartment exposed to the gas space in that compartment, thereby to reduce contact between the liquid in that compartment and any vapour arising from the liquid in the other compartment which enters the gas space of the compartment having the layer of particles.

For example, a layer of α-alumina flocs can be provided on the sodium surface, impregnated with a heavy inert gas such as xenon, forming a barrier which separates the sodium from the cathode vapours. Preferably the layer of α-alumina flocs or like particulate material has anti-wicking properties with regard to liquid sodium, so that it is not easily wettable and resists wetting by liquid sodium, i.e. liquid sodium exhibits a contact angle with regard to the surface of the material, which is as high as possible and preferably above 90°. Although α-alumina is more dense than molten sodium, it is expected to float by way of surface tension effects, in fine powder form.

Instead or in addition, the cell may include a filter layer of porous material extending across at least one of the compartments at a level above the level of liquid in that compartment at all states of charge of the cell, the filter layer being located so that the communication between the compartments is above the filter. The filter layer may be inert, being e.g. α-alumina flocs or fibres and functioning e.g. as a barrier to filter any liquid droplets from the inert gas, or it may be a gas absorbing material such as a dehydrated zeolite or an activated charcoal, provided e.g. in the cathode compartment, above the liquid electrolyte level, to absorb any vapours arising from the electrolyte; and porous material can be provided in the cathode compartment above the electrolyte level for reacting with one or more of the vapours from the electrolyte, thereby to eliminate them. For example, a fine NaCl powder in the cathode compartment can react with free AlCl₃ vapours, to form NaAlCl₄ having a substantially lower vapour pressure.

In the cathode compartment, furthermore, a suitable getter may be provided in the gas space above the NaAlCl₄ electrolyte for gettering AlCl₃. Thus finely divided granules of a transition metal can be used for this purpose, preferably one which is reactive with regard to AlCl₃ such as Fe, which can react therewith according to the reaction:

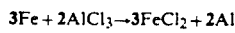

$$3Fe + 2AlCl_3 \rightarrow 3FeCl_2 + 2Al$$

While it is naturally possible, and may in some cases be desirable, to replace the opening between the anode and cathode compartments with a tortuous, narrow and/or lengthy passage to reduce diffusion of gases between the compartments, the embodiment of the present invention which omits the vapour trap and merely has an opening or hole between the anode compartment and cathode compartment has a number of advantages. In principle construction can be kept simple and inexpensive, as no sealing is required between the anode compartment and cathode compartment, and only the outer housing needs to be of sufficiently robust construction to contain the internal pressure of the cell, which pressure can be selected to be as close as possible to atmospheric. In particular, in this regard, the walls and general construction of the separator material which is used for the anode holder or envelope can be relatively thin, promoting high ionic conductivity, as these walls will not be subjected to any substantial pressure drop across them during normal or indeed abnormal operation.

A further advantage is that this construction permits an unlimited potential for overcharging, because, upon overcharging, the sodium level in the anode compartment merely rises until it overflows from the hole or opening into the cathode compartment. The overflowing sodium reacts in the cathode compartment with NaAlCl₄ to form Al and NaCl according to the chemical reaction:

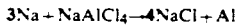

$$3Na + NaAlCl_4 \rightarrow 4NaCl + Al$$

Further charging/overcharging causes the NaCl and Al produced by said chemical reaction to be consumed in accordance with the [reverse] electrochemical reaction:

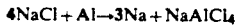

$$4NaCl + Al \rightarrow 3Na + NaAlCl_4$$

Thus, in principle, once the overflowing takes place overcharging can continue indefinitely, with no additional harm or damage to the cell other than any arising before overflowing commences, and with the only additional adverse effects being confined to wastage of power [charging potential] in the production of heat and in the circulation of sodium up through the anode compartment and downwardly into the cathode compartment where the above chemical and electrochemical reactions take place. Any harm arising from overcharging before overflowing commences can be made small by ensuring that the anode holder is substantially full of sodium when the cell is fully charged, so that the start of overcharging and the start of overflowing commence simultaneously. Naturally, the cell should be constructed so that there is no internal short-circuiting during such overflowing, e.g. so that the sodium drips from the anode compartment into the cathode compartment, without forming a continuous stream or path via which electronic short-circuiting can take place.

Naturally, while the version of the invention having the opening as opposed to the passage between the anode compartment and the cathode compartment has been described by way of example above with reference to sodium as the anode material and NaAlCl₄ as the electrolyte, with a separator which is a conductor of sodium ions, the invention can apply equally to other analogous systems, e.g. in which another alkali metal such as potassium or lithium is the anode material, the separator, correspondingly, being a conductor of potassium or lithium ions, the liquid electrolyte being, correspondingly, a potassium aluminium chloride electrolyte or lithium aluminium chloride electrolyte, and indeed the chloride anions in the electrolyte may be replaced by one or more other suitable halide ions, provided that said alkali metal, halide ions and separator are all compatible with one another.

The invention will now be described, by way of example, with reference to the accompanying diagrammatic drawings, in which.

Figure 1:
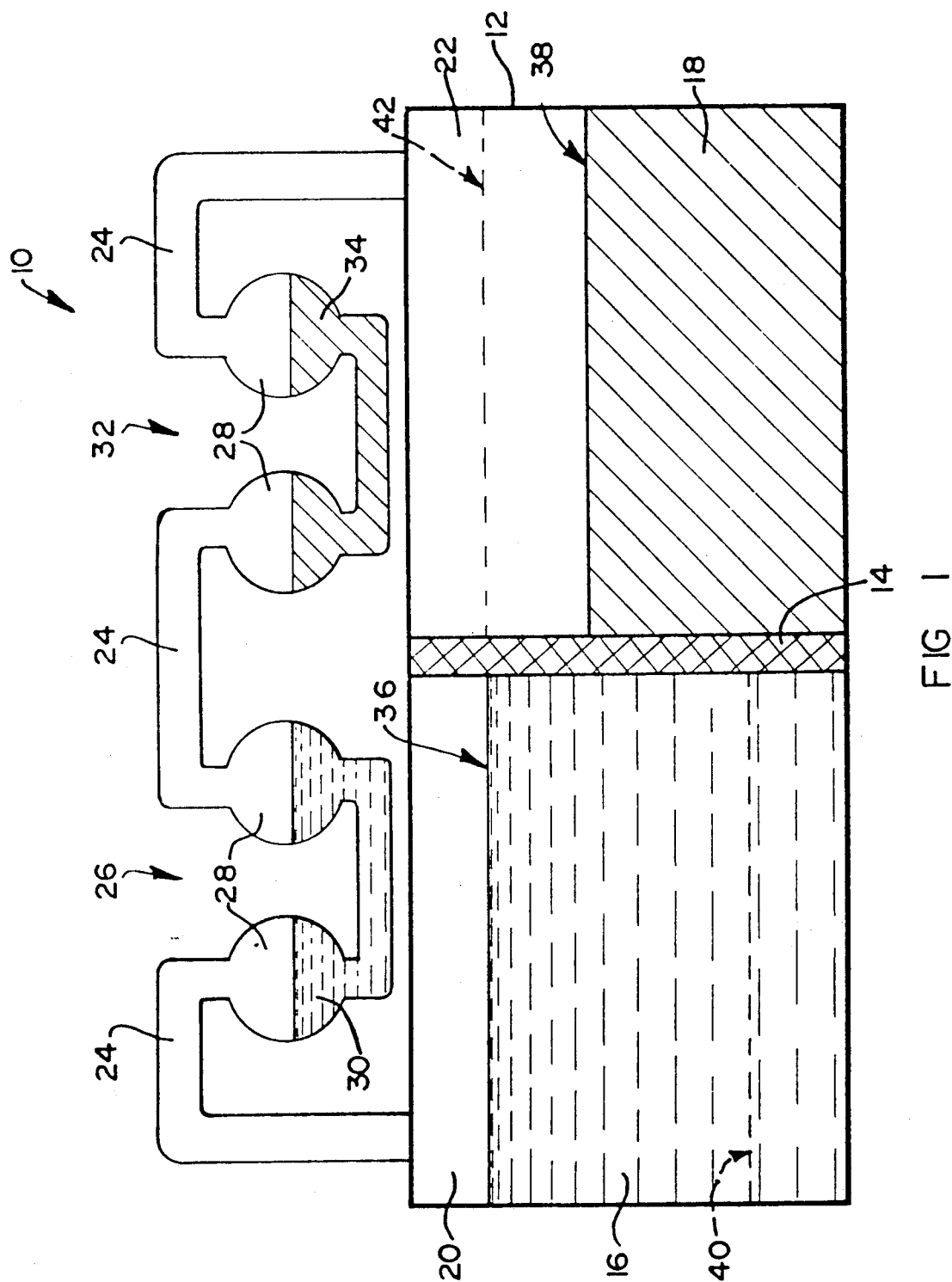
FIG. 1 shows a schematic sectional side elevation of a high temperature rechargeable electrochemical power storage cell in accordance with the present invention.

In FIG. 1 of the drawings, reference numeral 10 generally designates a cell in accordance with the invention. The cell 10 has a housing 12 divided by a beta"-alumina separator 14 into an anode compartment containing molten sodium anode material 16 and a cathode compartment containing a cathode 18 comprising an electronically conductive porous nickel matrix having NiCl₂ active cathode material dispersed therein. The matrix of the cathode 18 is saturated by and immersed in a sodium aluminium chloride molten salt electrolyte, a small proportion of solid sodium chloride being dispersed in the matrix of the cathode 18, to ensure that the Al:Na atomic ratio in the molten salt electrolyte is always slightly less than 1:1.

Suitable current collectors [not shown] will respectively be provided in the anode compartment in contact with the sodium 16 and in the cathode compartment in contact with the nickel matrix of the cathode 18, said current collectors leading to cell terminals [also not shown].

Above the level of the sodium 16 in the anode compartment is provided a gas space 20 containing argon. Similarly, above the cathode 18 in the cathode compartment is provided a gas pace 22, also containing argon.

The gas space 20 is connected to and placed in communication with the gas space 22 by means of a passage provided by a pipe 24.

The pipe 24 has two steam-type vapour traps therein, namely a vapour trap 26 comprising two bulbs 28 partially filled with molten sodium 30, the bulbs 28 being provided in adjacent vertical legs of the pipe 24 and being interconnected by a horizontal leg of the pipe 24 entering them from below. A further vapour trap 32 is provided, of substantially the same construction, containing molten sodium aluminium chloride 34, also partially filling the bulbs 28 in question. The sodium aluminium chloride 34 is in contact with some solid sodium chloride and with some solid aluminium metal. It accordingly has an Al:Na atomic ratio slightly less than 1:1.

The cell 10 in FIG. 1 is shown in its fully charged state, with the molten sodium 16 below the gas space 20 occupying the anode compartment to a level 36. In this fully charged state the sodium aluminium chloride electrolyte of the cathode 18, within which the matrix is immersed, occupies the cathode compartment to a level 38.

When the cell is fully discharged, the sodium 16 in the anode compartment drops to level 40 [shown in broken lines] while the liquid electrolyte level in the cathode compartment rises to level 42 [also shown in broken lines]. For purposes of illustration the anode and cathode compartments have been drawn of the same shape and size, and it will be apparent that the sodium level drops substantially more during discharging than the molten sodium aluminum chloride electrolyte level rises during discharging. This is because the discharge reaction products obtained in the cathode compartment in accordance with the reaction:

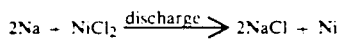

are substantially denser than the liquid sodium reagent.

In the cell in question the gas spaces 20 and 22 will be charged with argon at a pressure which, at the operating temperature of the cell which would typically be in the region of 250°-300° C., will be about 1 atmosphere when the cell is approximately midway through a cell charge/discharge cycle. When the cell is fully charged the total volume of the gas spaces 20 and 22 will be at its minimum, so that the gas pressure will be somewhat above atmospheric pressure, and when the cell is completely discharged the total volume of the gas spaces 20 and 22 will be at its maximum, so that the gas pressure will be somewhat below atmospheric pressure. Naturally, if desired, the gas pressure in the spaces 20 and 22 may be selected when the cell is loaded so that the gas pressure therein at the operating temperature when the cell is fully charged exceeds atmospheric pressure by substantially as much as it drops to below atmospheric pressure when the cell is fully discharged. This will not necessarily correspond exactly with atmospheric pressure in the spaces 20 and 22 when the cell is midway through a charge or discharge cycle, but will approximate this condition, and atmospheric pressure will be present in the cell when it is in fact discharged somewhat more than midway, so that at midway through a charge/discharge cycle pressure is slightly above atmospheric.

During discharging, gas will pass from the gas space 22 via the pipe 24 into the gas space 20, and will move in the opposite direction during charging. As the gas moves along the pipe 24 it will pass through the vapour traps 26 and 32.

During discharging any AlCl₃ vapour in the gas space 22 will react with NaCl in the electrolyte 34 in the bulbs 28 of the trap 32 to form further NaAlCl₄. Any HCl present in the said gas arising from reaction of electrolyte with any moisture present will react with the aluminium metal to form AlCl₃ [together with H₂ gas, which is inert in the cell environment], which then reacts with NaCl in the NaAlCl₄ material 34. Argon leaving the vapour trap 32 in the direction of the vapour trap 26 will accordingly contain very little AlCl₃ and substantially no HCl. Any AlCl₃ and/or NaAlCl₄ in this gas will react with sodium 30 in the bulbs 28 of the trap 26 to form NaCl and aluminium metal. Naturally, any NaAlCl₄ from the gas space 22 entering the trap 32 will merely condense in the NaAlCl₄ in the bulbs 28 of the trap 32.

When the cell is being charged, gas will move in the opposite direction from the space 20 into the space 22. Any sodium in this gas passing from the vapour trap 26 into the vapour trap 32 will react with NaAlCl₄ in the vapour trap 32 to produce NaCl and aluminium metal.

It will be appreciated that, accordingly, sodium vapour is kept out of the gas space 22, and AlCl₃ and HCl are kept out of the gas space 20. The volume of sodium 30 in the bulbs 28 of the vapour trap 26 and the amounts of NaAlCl₄, NaCl and aluminium metal in the bulbs 28 of the vapour trap 32, will be selected to be sufficient to entrap and scavenge all the sodium, AlCl₃ and HCl vapours expected to pass along the pipe 24 during the intended service or design life of the cell.

Naturally, if desired, the vapour traps can be kept at a temperature lower than the electrodes, further to reduce the vapour pressures of the liquids in the vapour traps.

Figure 2:
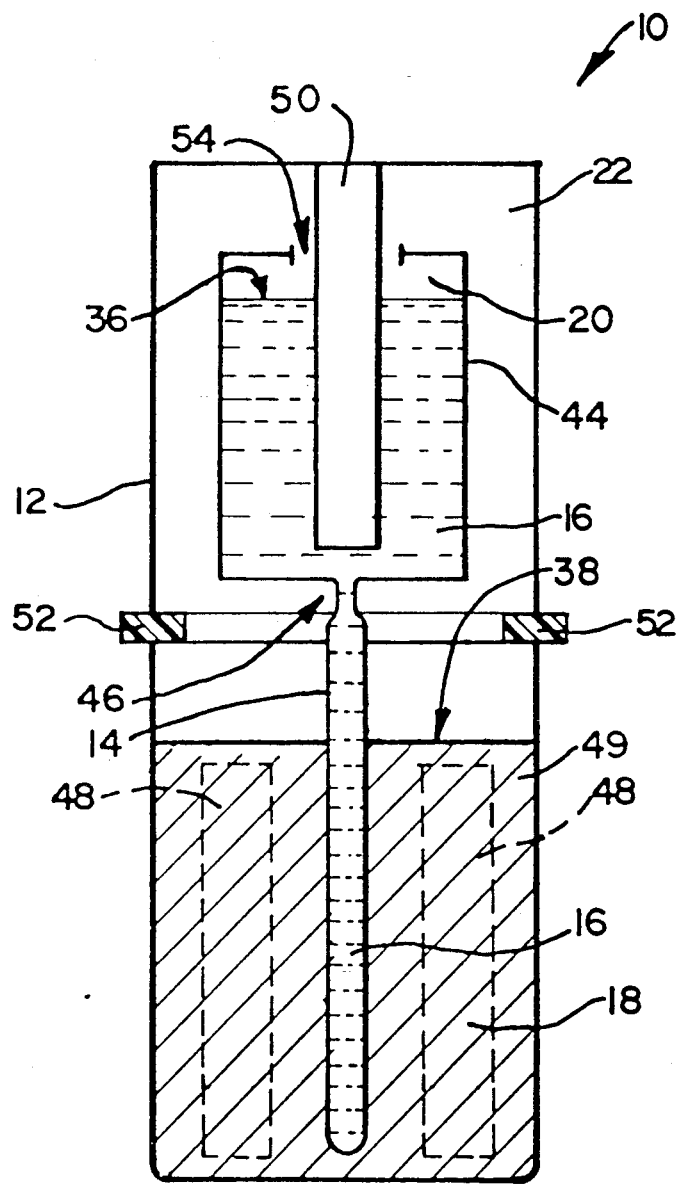
FIG. 2 shows a schematic sectional side elevation of another high temperature rechargeable electrochemical power storage cell according to the invention.

Turning to FIG. 2, the same reference numerals refer to the same parts as in FIG. 1, unless otherwise specified.

In the case of FIG. 2, the outer housing 10 is in the form of a suitable metal can, e.g. of mild steel. The separator 14 is in the form of a laterally compressed $\beta''$-alumina envelope of flattened shape, located within the housing 12. The envelope 14 has an upward extension in the form of a $\beta''$-alumina reservoir 44, to which it is connected via a neck 46. The envelope 14 contains sodium anode material 16, as does the reservoir 44, the level 36 of the sodium 16 and the reservoir 44 being shown in the fully charged state of the cell, as is the level 38 of liquid electrolyte.

It will be appreciated from FIG. 2 that the interior of the envelope 14 forms the anode compartment, and the anode compartment as a whole is located within the housing 10, the interior of the housing 10 outside the envelope 14 and reservoir 44 forming the cathode compartment. The matrix of the cathode 18 is divided into two portions 48 in the form of slabs, located on opposite sides of and face-to-face with, and spaced from the envelope 14, immersed in the electrolyte 49 of the cathode 18. The matrix portions 48 are once again connected to suitable cathode current collectors [not shown] and a current collector 50 for the anode is shown passing downwardly from the housing 12 through the top of the reservoir 44 into the sodium 16 in the reservoir.

In this regard it should be appreciated that the housing is divided into two portions, namely an upper portion in electronic conduct with the sodium 16 via the current collector 50 and a lower portion in electronic contact with the cathode current collectors. The division between these portions is provided by a circumferentially extending insulating seal 52, which is located above the level which the electrolyte in the cathode compartment will occupy when the cell 10 is fully discharged. Said upper portion can thus act as the anode terminal of the cell, whereas the lower portion acts as the cathode terminal.

A concentric opening 54 is shown in the upper wall or roof of the reservoir 44, around the anode current collector 50. This opening 54 provides communication between the gas space 20 and the gas space 22.

During charging and discharging, the level of electrolyte [see 38 in FIG. 2] moves up and down in the cathode compartment below the seal 52 and above the matrix portions 48, and the level of sodium [see 36 in FIG. 2] moves up and down in the reservoir 44.

Over a period of extended operation, it is expected that small amounts of sodium vapour can migrate via the opening 54 from the gas space 20 to the gas space 22, to react there with $NaAlCl_4$ vapour to produce NaCl and Al which settle into the electrolyte where they are consumed during subsequent charging to produce $NaAlCL_4$ which supplements the electrolyte and sodium which enters the anode compartment to supplement the sodium therein. Similarly small amounts of $NaAlCl_4$ vapour can migrate from the gas space 22 via the opening 54 into the gas space 20, where they can react with sodium vapour from the sodium 16, to produce NaCl and Al which can form a crust or layer at 36 on the sodium 16 in the reservoir 44, without harming normal operation in any way over the normal service life of the cell. Even if the cell is somewhat overcharged, and if the spaces 20 and 22 contain $AlCl_3$ vapour, this $AlCl_3$ can react similarly with sodium vapour to produce additional NaCl and Al; and any HCl which is produced by reaction of $NaAlCl_4$ with moisture can be gettered by providing a suitable getter therefor, e.g. in the gas space 22 above the cathode, finely divided Al, Zn or a suitable transition metal being suitable for this purpose. This getter can also react with any $AlCl_3$ vapour in the gas space 22 to remove it therefrom.

In the event of substantial or continuous overcharge, the level of sodium 16 merely rises in the reservoir 44, until it overflows via the opening 54, after which it drops down on to the electrolyte in the cathode compartment, with which it reacts chemically to produce NaCl and Al, the continuous charging potential then causing this NaCl and Al to react electrochemically to produce further $NaAlCl_4$ and sodium, the sodium passing through the wall of the envelope 14 into the interior of the envelope. Continuous overcharging thus merely causes wasted heat, and a circulation of sodium upwards through the envelope 14 and reservoir 44 with continuous overflow and chemical and electrochemical reactions as described.

Indeed, in practice the sodium 16 can be selected substantially to fill the reservoir 44 in the fully charged state, and if any crust at 36 becomes troublesome, the cell can be deliberately overcharged briefly to wash this crust into the cathode compartment with overflowing sodium, to be consumed during subsequent charging of the cell.

Figure 3:
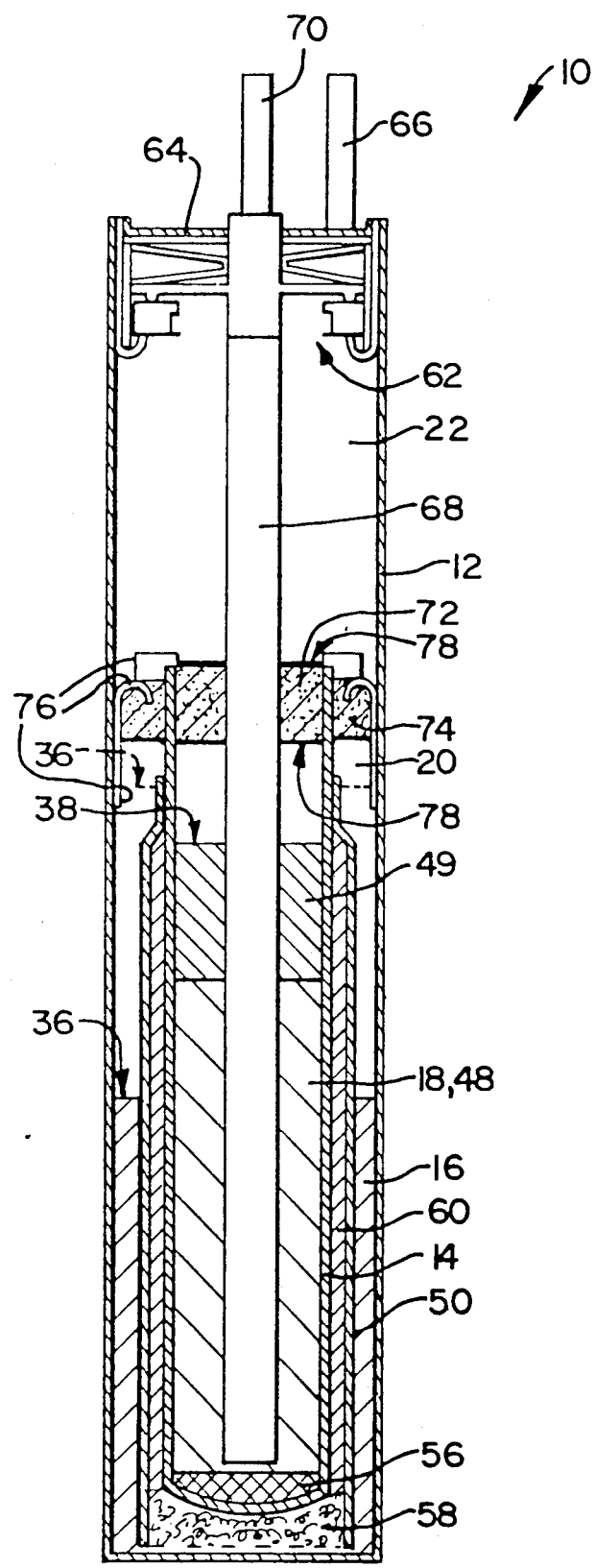
FIG. 3 shows a schematic sectional side elevation of a yet further high temperature rechargeable electrochemical power storage cell according to the invention.

In FIG. 3 is shown a test cell employed by the Applicant to test the feasibility of the present invention. Once again, unless otherwise specified, the same reference numerals refer to the same parts in FIG. 3 as in FIGS. 1 and 2. The cell 10 of FIG. 3 is of the cylindrical type, the housing 12 being a cylindrical mild steel can and having a cylindrical $\beta''$-alumina tube separator 14, closed at its lower end, located concentrically therein. The cathode 18, having an annular matrix 48 and immersed in the electrolyte 49, is located in the tube 14, on a bed 56 of carbon felt saturated with said electrolyte.

The sodium anode 16 is outside the tube 14 in the can 12 and an aluminium wicking sleeve 50 is attached concentrically around the tube 14, the sleeve 50 having its lower end spaced above the floor of the can 12. The lower end of the sleeve 50 is filled with steel wire wool 58 on which the tube 14 rests. Carbon balls 60, forming a sodium wick, fill the annular space between the tube 14 and sleeve 50, and sodium 16 fills the spaces between the balls 60 and occupies the annular space between the sleeve 50 and the can 12 to level 36.

The top of the can 12 is closed off by a conventional compression seal 62 and the can 12 has a lid 64 provided with an anode terminal post 66, a cathode current collector in the form of an aluminium rod 68 projecting concentrically down the can 12 from the seal 62 and into the central passage of the matrix 48 of the cathode 18. The rod 68 is insulated in the seal 62 from the lid 64 and can 12, and has a terminal post 70 connected to its upper end.

A particular feature of the cell of FIG. 3 is the provision of a filter layer 72 of porous material in the form of ceramic ($\alpha$-alumina) fibres closing off the open upper end of the tube 14 around the rod 68, and a similar layer 74 closes off the annular space between the top of the tube 24 and the can 12. The layer 74 is supported by a collar-shaped spacer 76 which spaces the tube 14 concentrically from the walls of the can 12; and the layer 72 is held in place by two thin nickel washers 78 fitting fictionally, but not sealingly, between the rod 68 and tube 14.

In a test cell of the type shown in FIG. 3 which has been tested by the Applicant, the tube 14 had a length of about 160 mm and inner diameter of 30 mm. A cathode was used comprising 70.039 g of nickel in the matrix 48, with 85,9 g of $NaAlCl_4$ melt and 45,857 g of NaCl dispersed in the matrix in the discharged state. The cathode 18 had a height in the charged state of 100 mm and a capacity of 21,01 Ah. The sodium 16 filled the can 12 outside the tube 14 to within 20 mm of the top of the tube 14, in the charged state (shown at 36).

The cell was operated for 140 days at a temperature of 250° C. during which period it was put through 172 charge/discharge cycles. During this period the cell exhibited a steady internal resistance of 40 m$\Omega$, equivalent to 3,58 m$\Omega$/cm$^2$ of separator area of the tube 14. Furthermore the cell capacity during charge and discharge remained substantially constant over the test period.

It should be appreciated that, optionally, a thin layer of chemically inert particles can be provided, floating on the liquid surfaces in the anode and cathode compartments, i.e. at 36 and 38 respectively, to reduce the surface area of said liquids exposed to the resective gas spaces 20 and 22.

A particular advantage of the invention is that pressure in the gas space 20 will at all times be the same as pressure in the gas space 22. This means that the separator 14 will at no time be stressed by differential gas pressures across it. This can be important when thin separators 14 are employed to reduce the internal resistance of the cell and the mass of the cell, bearing in mind that such separators can be brittle. A further advantage of the invention is that, by interconnecting the gas spaces 20 and 22, a drop in liquid level in the anode compartment with an increase in the size of the gas space 20 can at least partially compensate for the associated rise in liquid level in the cathode compartment and decrease in the size of the gas space 22, and vice versa. This means that the average gas pressure inside the housing 12 can be kept as near as practicable to atmospheric pressure during operation, bearing in mind the changes in internal pressure in the housing 12 which will necessarily result from changes in volume and density of the cell contents upon charging and discharging.

With particular reference to FIG. 2 of the drawings, the absence of any gas pressure drop across the walls of the envelope 14 or reservoir 44 means that thin inexpensive material in the form of a $\beta''$-alumina artifact can be used therefor, as stressing will be minimal. This thinness, with particular reference to the envelope 14, means that the walls of the envelope provide relatively good ionic conductivity. Naturally, the ability of the embodiment of FIG. 2 to accept what could otherwise be a catastrophic continuous overcharge is a further substantial advantage.

Similar considerations apply to the cell of FIG. 3 and the testing of the cell of FIG. 3 has shown that the present invention is feasible over extended periods of operation. No discernable increase in internal resistance was found to arise which could be attributed to any reaction between anode and electrolyte vapours; and the constancy of capacity indicated that no internal short-circuiting took place.

I claim:

1. A high temperature electrochemical power storage cell which comprises an anode and a cathode separated by a separator which is a conductor of electrochemically active anode material, the anode and the cathode being located in a cell housing which is divided by the separator into an anode compartment containing the anode and a cathode compartment containing the cathode, the anode being a molten liquid at the operating temperature of the cell and the cathode compartment containing a liquid at the operating temperature of the cell, each of the anode compartment and the cathode compartment having therein, above the liquid therein, a gas space occupied by an inert gas and a vapour arising from the liquid in said compartment, the inert gas having a partial pressure in each said gas space at the operating temperature of the cell of at least 10 kPa, the compartments being in communication with each other but being otherwise sealed, and the cell having an operative attitude in which it is upright and in which attitude the communication between the compartments is at a level above the levels of the liquids in the compartments at all states of charge of the cell.

2. A cell as claimed in claim 1, in which the communication between the compartments is by means of a passage interconnecting the compartments, the cell including, in said passage, at least one vapour trap for extracting at least one vapour arising from said liquids from inert gas flowing along the passage.

3. A cell as claimed in claim 2, in which the cell includes two said vapour traps in the passage, namely an anode vapour trap for extracting vapour arising from the liquid in the anode compartment from the inert gas, and a cathode vapour trap for extracting vapour arising from the liquid in the cathode compartment from the inert gas.

4. A cell as claimed in claim 3, in which the anode vapour trap contains molten anode material, being located between the anode and the cathode vapour trap, the cathode vapour trap containing the same liquid as that occupying the cathode compartment and being located between the cathode and the anode vapour trap.

5. A cell as claimed in claim 1, in which the separator is in the form of a holder for the anode material, holding the active anode material in its interior, the holder being located in the interior of the cathode compartment and the cathode compartment providing the cell housing.

6. A cell as claimed in claim 5, in which the holder is in the form of a laterally compressed envelope, having a pair of spaced major faces joined to each other at their edges, the envelope being in communication with a reservoir for anode material, the reservoir forming part of the holder and being located above the envelope in the operative attitude of the cell, and the cathode comprising two portions located on opposite sides of the envelope.

7. A cell as claimed in claim 1, in which the inert gas partial pressure in the gas spaces is selected so that, at the operating temperature of the cell, at a state of charge of the cell intermediate the extreme fully charged state and the extreme fully discharged state of the cell, the total pressure in the compartments is equal to atmospheric pressure, and so that the change in said total pressure between said intermediate state of charge and said extreme states of charge is the same in magnitude.

8. A cell as claimed in claim 1, in which the anode is a molten alkali metal, the separator being a solid electrolyte conductor of ions of the alkali metal of the anode, and the liquid in the cathode compartment being selected from the group consisting of molten salt electrolytes and molten salt catholytes.

9. A cell as claimed in claim 8, in which the molten alkali metal anode is sodium, the solid electrolyte being a conductor of sodium ions, and the liquid in the cathode compartment being a metal halide electrolyte, the cathode comprising a solid active cathode substance in contact with the liquid electrolyte.

10. A cell as claimed in claim 9, in which the solid electrolyte is $\beta''$-alumina, the liquid electrolyte being a sodium aluminium halide molten salt electrolyte in which, at all stages of charge of the cell, the Al:Na atomic ratio is no greater than 1:1, and the active cathode substance being a member of the group consisting of $FeCl_2$, $NiCl_2$, $CrCl_2$, $CoCl_2$, $MnCl_2$, $CuCl_2$ and mixtures of two of more thereof, the active cathode substance being dispersed in an electronically conductive electrolyte-permeable matrix impregnated with said molten salt electrolyte, the inert gas in the gas spaces being argon.

11. A cell as claimed in claim 1, which includes a layer of particles which are chemically inert in the cell environment and float on at least one of the liquids in the compartments, the layer acting to reduce the surface area of the liquid in that compartment exposed to the gas space in that compartment, thereby to reduce contact between the liquid in that compartment and any vapour arising from the liquid in the other compartment which enters the gas space of the compartment having the layer of particles.

12. A cell as claimed in claim 1, which includes a filter layer of porous material extending across at least one of the compartments at a level above the level of liquid in that compartment at all states of charge of the cell, the filter layer being located so that the communication between the compartments is above the filter.

* * * * *